(12) United States Patent
Kim et al.

(10) Patent No.: US 10,090,497 B2
(45) Date of Patent: Oct. 2, 2018

(54) SECONDARY BATTERY

(71) Applicant: Samsung SDI Co., Ltd., Yongin-si, Gyeonggi-do (KR)

(72) Inventors: Deakyu Kim, Yongin-si (KR); Sunggwi Ko, Yongin-si (KR); Shinjung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/446,308

(22) Filed: Mar. 1, 2017

(65) Prior Publication Data

US 2017/0294635 A1    Oct. 12, 2017

(30) Foreign Application Priority Data

Apr. 11, 2016  (KR) .................... 10-2016-0044011

(51) Int. Cl.
*H01M 2/30* (2006.01)
*H01M 2/12* (2006.01)
*H01M 10/0525* (2010.01)

(52) U.S. Cl.
CPC ..... *H01M 2/1241* (2013.01); *H01M 10/0525* (2013.01); *H01M 2200/20* (2013.01); *H01M 2220/20* (2013.01)

(58) Field of Classification Search
CPC ................................. H01M 2/30; H01M 2/022
See application file for complete search history.

(56) References Cited

U.S. PATENT DOCUMENTS

| | | | |
|---|---|---|---|
| 2007/0202397 A1 | 8/2007 | Cho | |
| 2010/0075221 A1* | 3/2010 | Mehta | ............... H01M 2/0257 429/178 |
| 2010/0136407 A1* | 6/2010 | Beecher | ............ H01M 2/0267 429/121 |
| 2011/0104538 A1 | 5/2011 | Yeo | |
| 2014/0363731 A1 | 12/2014 | Tanaka et al. | |

FOREIGN PATENT DOCUMENTS

| | | |
|---|---|---|
| KR | 10-2007-0088893 | 8/2007 |
| KR | 10-2011-0046871 | 5/2011 |
| KR | 10-2014-0016232 | 2/2014 |

* cited by examiner

*Primary Examiner* — Olatunji Godo
(74) *Attorney, Agent, or Firm* — Lewis Roca Rothgerber Christie LLP

(57) ABSTRACT

A secondary battery includes a cylindrical can; an electrode assembly accommodated in the cylindrical can with an electrolyte; a cap assembly sealing the cylindrical can, a top-end height of the cap assembly being equal to or less than a top-end height of the cylindrical can; and an insulation layer on a surface of the cap assembly that is exposed to the outside of the cylindrical can.

11 Claims, 5 Drawing Sheets

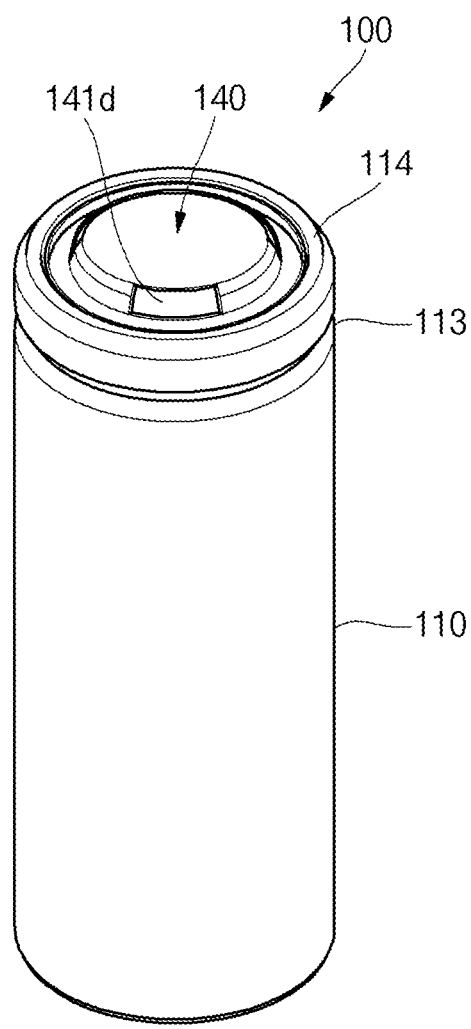

SECONDARY BATTERY

CROSS-REFERENCE TO RELATED APPLICATION

This application claims priority to and the benefit of Korean Patent Application No. 10-2016-0044011, filed on Apr. 11, 2016 in the Korean Intellectual Property Office, and all the benefits accruing therefrom under 35 U.S.C. § 119, the content of which is herein incorporated by reference in its entirety.

BACKGROUND

1. Field

Various aspects of the present invention relate to a secondary battery.

2. Description of the Related Art

A lithium ion secondary battery is widely used as a power source of a hybrid vehicle or an electric vehicle as well as of a portable electronic device due to certain characteristics, including having a relatively high operating voltage and relatively high energy density per unit weight.

The secondary battery can be classified into a cylindrical type, a prismatic type, or a pouch type. The cylindrical secondary battery generally includes a cylindrical electrode assembly, a cylindrical can accommodating (e.g., coupled to) the electrode assembly, an electrolyte injected into the can to allow lithium ions to move, and a cap assembly coupled to one side of the can to prevent leakage of the electrolyte while preventing deviation or movement of the electrode assembly.

SUMMARY

Embodiments of the present invention provide a secondary battery.

The above and other aspects of the present invention will be described in or will be apparent from the following description of exemplary embodiments thereof.

According to an embodiment of the present invention, a secondary battery includes: a cylindrical can, an electrode assembly accommodated in the cylindrical can with an electrolyte, a cap assembly sealing the cylindrical can, and an insulation layer on a surface of the cap assembly that is exposed to the outside of the cylindrical can. A top-end height of the cap assembly is equal to or less than a top-end height of the cylindrical can.

The insulation layer may include a polyimide film or a hot melt block.

The cap assembly may include a cap-up including: a terminal portion; a bent portion downwardly bent from the terminal portion; and an extending portion outwardly extending from the bent portion. The insulation layer may be on the extending portion of the cap-up.

A thickness of the insulation layer may be less than a height of the bent portion.

A thickness of the insulation layer may be equal to or less than a height of the bent portion.

The cap assembly may further include a safety plate including: a main body under the cap-up; a main-body bent portion upwardly extending from a periphery of the main body; and a main-body extending portion inwardly extending from the main-body bent portion and covering a top surface of the cap-up. The insulation layer may be on the main-body extending portion of the safety plate.

The insulation layer on the cap-up and the insulation layer on the safety plate may be connected to each other.

The secondary battery may further include a gasket between the cylindrical can and the cap assembly, and the insulation layer may be between the gasket and the cap assembly.

The secondary battery may further include a lead tab connected to a top end of the cylindrical can.

The insulation layer may be between the lead tab and the cap assembly.

As described above, a secondary battery according to embodiments of the present invention can reduce or prevent unintended or unnecessary electric shorts between a cylindrical can and a cap assembly. For example, according to embodiments of the present invention, a film-type or block-type insulation layer is formed on a surface of the cap assembly and is configured such that it is interposed between a lead tab connected to the cylindrical can and the cap assembly, thereby preventing the cylindrical can and the cap assembly from being electrically shorted to each other by the lead tab or reducing the occurrences thereof.

Therefore, according to embodiments of the present invention, for example, a negative electrode lead tab is electrically connected to a top end of the cylindrical can and a positive electrode lead tab is electrically connected to a top end of the cap assembly, thereby facilitating fabrication of a battery module and simplifying a module structure.

The above information disclosed in this Background section is for enhancement of understanding of the background of the described technology and may contain information that is not prior art.

BRIEF DESCRIPTION OF THE DRAWINGS

The above and other features of the present invention will become more apparent by describing, in detail, exemplary embodiments thereof with reference to the attached drawings in which:

FIGS. 1A, 1B, and 1C are a perspective view, a cross-sectional view, and an exploded perspective view, respectively, of a secondary battery according to various embodiments of the present invention;

DETAILED DESCRIPTION

Figure 1B:
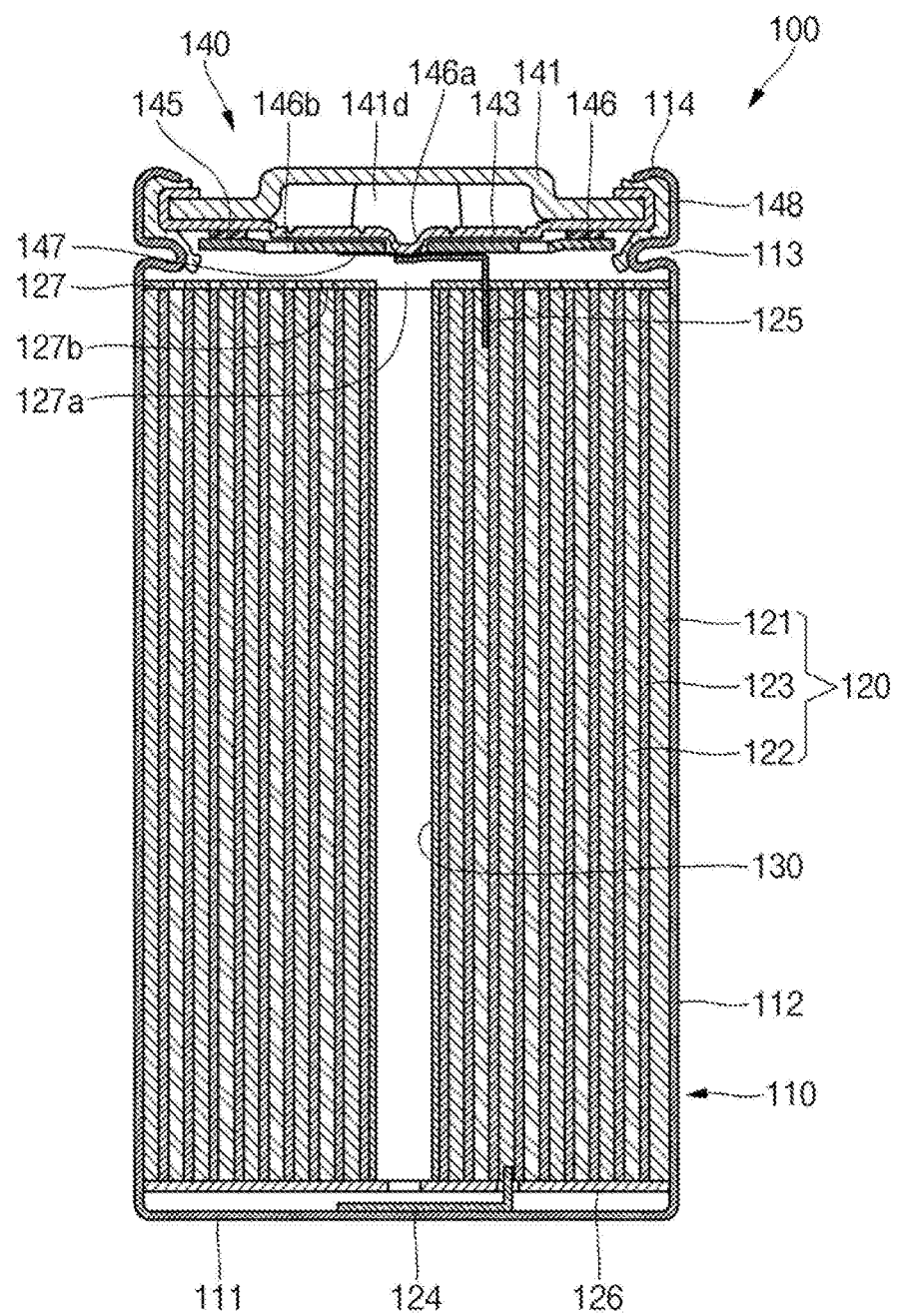

Hereinafter, exemplary embodiments of the present invention will be described, in detail, with reference to the accompanying drawings such that they can easily be made and used by those skilled in the art. The present invention may, however, be embodied in many different forms and should not be construed as being limited to the exemplary embodiments set forth herein. Rather, these embodiments are provided so that this disclosure will be thorough and complete and will fully convey the concept of the present invention to those skilled in the art, and the present invention will be defined by the appended claims and their equivalents.

In the drawings, the thickness of layers and regions may be exaggerated for clarity. Like numbers refer to like elements throughout. As used herein, the term "and/or" includes any and all combinations of one or more of the associated listed items. It will also be understood that when an element A is referred to as being "coupled to" or "connected to" an element B, the element A can be directly coupled or connected to the element B or an intervening element C may be present therebetween such that the element A and the element B are indirectly connected to each other.

The terminology used herein is for the purpose of describing particular exemplary embodiments and is not intended to be limiting of the present invention. As used herein, the singular forms "a" and "an" are intended to include the plural forms as well, unless the context clearly indicates otherwise. It will be further understood that the terms "comprise, include," "comprising," and/or "including," when used in this specification, specify the presence of the stated features, integers, steps, operations, elements, and/or components but do not preclude the presence or addition of one or more other features, integers, steps, operations, elements, components, and/or groups thereof. It will also be understood that, although the terms first, second, etc. may be used herein to describe various members, elements, regions, layers, and/or sections, these members, elements, regions, layers and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1C:
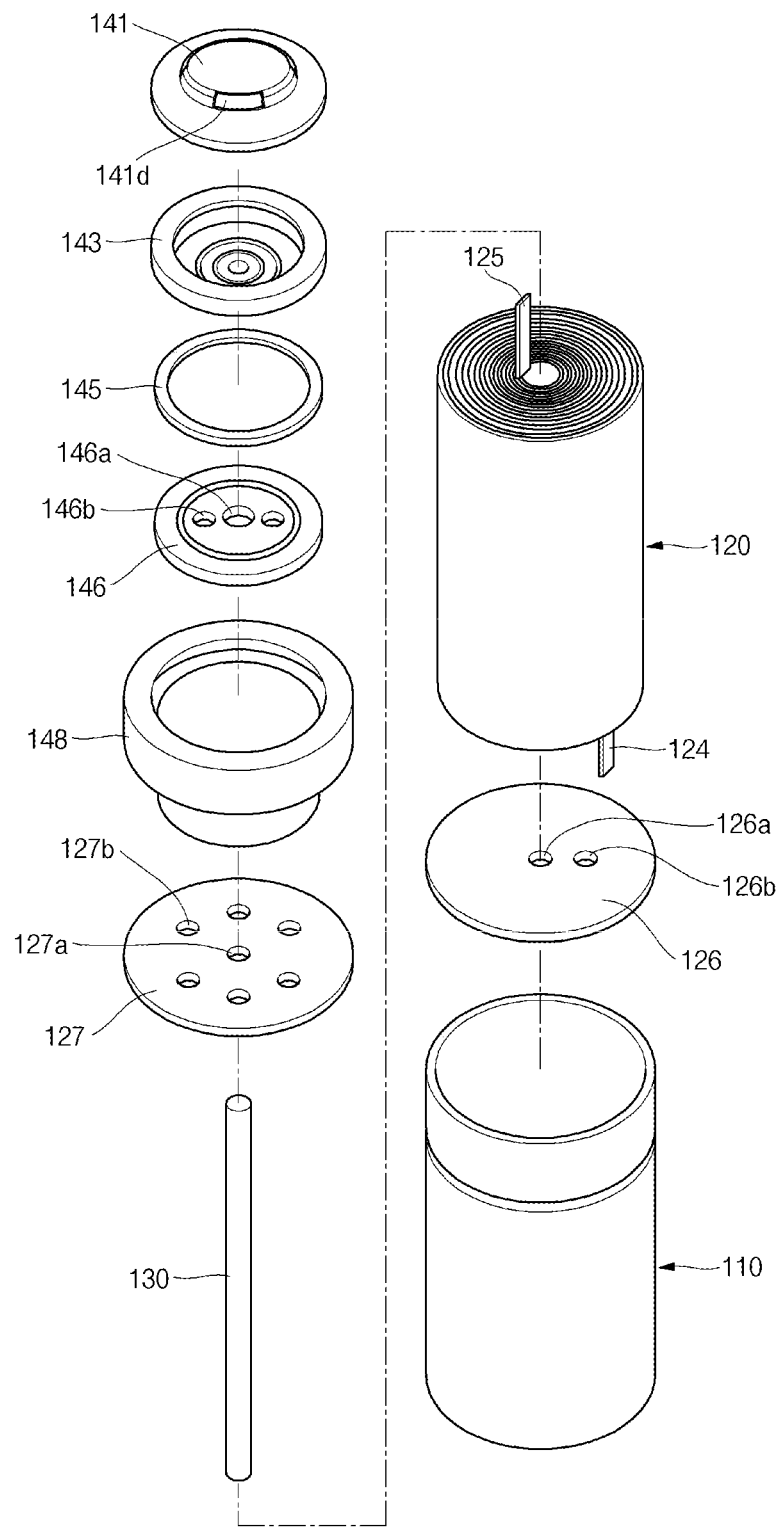

FIGS. 1A, 1B, and 1C are a perspective view, a cross-sectional view, and an exploded perspective view, respectively, of a secondary battery (100) according to various embodiments of the present invention.

As illustrated in FIGS. 1A, 1B, and 1C, the secondary battery 100 according to various embodiments of the present invention includes a cylindrical can 110, an electrode assembly 120, and a cap assembly 140. In addition, the secondary battery 100, according to some embodiments of the present invention, may further include a center pin 130 coupled to the electrode assembly 120.

The cylindrical can 110 includes a circular bottom portion 111 and a side portion 112 upwardly extending (e.g., upwardly extending a predetermined length) from the bottom portion 111. During a manufacturing process of the secondary battery 100, a top portion (e.g., a top end) of the cylindrical can 110 is open. Therefore, during assembly (e.g., during the manufacturing process) of the secondary battery 100, the electrode assembly 120 may be inserted into the cylindrical can 110 together with an electrolyte. The cylindrical can 110 may be made of steel, a steel alloy, aluminum, an aluminum alloy, or an equivalent thereof, but embodiments of the present invention are not limited thereto. In addition, a bead 113 (e.g., a beading part) inwardly recessed around the cap assembly 140 may be formed at a top portion of the cylindrical can 110 to prevent the cap assembly 140 from deviating in the cylindrical can 110 (e.g., to prevent the cap assembly from moving toward the electrode assembly 120), and an inwardly bent crimping portion 114 may be formed above the bead 113.

The electrode assembly 120 is accommodated within the cylindrical can 110. The electrode assembly 120 includes a negative electrode plate 121 coated with a negative electrode active material (e.g., graphite or carbon), a positive electrode plate 122 coated with a positive electrode active material (e.g., a transition metal oxide, such as $LiCoO_2$, $LiNiO_2$, $LiMn_2O_4$, etc.), and a separator 123 positioned between the negative electrode plate 121 and the positive electrode plate 122 to prevent a short circuit from occurring therebetween and allowing lithium ions to move. The negative electrode plate 121, the positive electrode plate 122, and the separator 123 are wound in a substantially cylindrical shape. The negative electrode plate 121 may include a copper (Cu) or nickel (Ni) foil, the positive electrode plate 122 may include an aluminum (Al) foil, and the separator 123 may include polyethylene (PE) or polypropylene (PP), but embodiments of the present invention are not limited thereto. In addition, a negative electrode tab 124 may be welded to the negative electrode plate 121 to protrude and downwardly extend (e.g., downwardly extend a predetermined length) therefrom, and a positive electrode tab 125 may be welded to the positive electrode plate 122 to upwardly protrude (e.g., upwardly protrude a predetermined length) therefrom. However, embodiments of the present invention are not limited thereto, and the positions of the negative electrode tab 124 and the positive electrode tab 125 may be switched. The negative electrode tab 124 may be made of copper or nickel, and the positive electrode tab 125 may be made of aluminum, but embodiments of the present invention are not limited thereto.

In addition, the negative electrode tab 124 of the electrode assembly 120 may be welded to the bottom portion 111 of the cylindrical can 110. Therefore, the cylindrical can 110 may operate as a negative electrode. In another embodiment, the positive electrode tab 125 of the electrode assembly 120 may be welded to the bottom portion 111 of the cylindrical can 110. In this embodiment, the cylindrical can 110 may operate as a positive electrode.

Additionally, a first insulation plate 126, which is coupled to the cylindrical can 110 and has a first opening 126a (e.g., a first hole) formed at its center and at least one second opening 126b (e.g., at least one second hole) formed adjacent to the first opening 126a, may be interposed between the electrode assembly 120 and the bottom portion 111 of the cylindrical can 110. The first insulation plate 126 may prevent the electrode assembly 120 from being brought into contact with (e.g., from being directly electrically connected to) the bottom portion 111 of the cylindrical can 110. For example, the first insulation plate 126 may prevent the positive electrode plate 122 of the electrode assembly 120 from being electrically brought into contact with the bottom portion 111 of the cylindrical can 110. The first opening 126a may serve to allow gases to rapidly move upward through the center pin 130 when the gases are generated in large amounts due to an abnormality in the secondary battery 100, and the second opening 126b may serve to allow the negative electrode tab 124 to be welded to the bottom portion 111 of the cylindrical can 110 while the negative electrode tab 124 passing through the second opening 126b.

In addition, a second insulation plate 127, which is coupled to the cylindrical can 110 and has a first opening 127a (e.g., a first hole) formed at its center and second openings 127b (e.g., second holes) formed around the first opening 127a, may be interposed between the electrode assembly 120 and the cap assembly 140. The second insulation plate 127 may prevent the electrode assembly 120 from being brought into contact with (e.g., from being directly electrically connected to) the cap assembly 140. For example, the second insulation plate 127 may prevent the negative electrode plate 121 of the electrode assembly 120 from being electrically brought into contact with the cap assembly 140. The first opening 127a may serve to allow gases to rapidly move to the cap assembly 140 when the gases are generated in large amounts due to an abnormality in the secondary battery 100, and at least one of the second openings 127b, through which the positive electrode tab 125 passes, may serve to allow the positive electrode tab 125 to be welded to the cap assembly 140. In addition, the remaining second openings 127b may allow the electrolyte to rapidly flow to the electrode assembly 120 during the process of injecting the electrolyte.

Because sizes (e.g., diameters) of the first openings 126a and 127a in the first and second insulation plates 126 and 127 are smaller than a size (e.g., a diameter) of the center pin 130, the center pin 130 may not be brought into contact with (e.g., may not be electrically connected to) the bottom portion 111 of the cylindrical can 110 or to the cap assembly 140 due to external impacts.

In some embodiments, the center pin 130 is a hollow cylindrical pipe and may be coupled to the center (e.g., to approximately the center) of the electrode assembly 120. The center pin 130 may be made of steel, a steel alloy, aluminum, an aluminum alloy, or polybutylene terephthalate, but embodiments of the present invention are not limited thereto. The center pin 130 may suppress the electrode assembly 120 from being distorted during charging and discharging of the secondary battery 100 and may serve as a moving path of gases generated in the secondary battery 100. In some embodiments, the center pin 130 may not be provided.

The cap assembly 140 includes a cap-up 141 having a plurality of openings 141d (e.g., through-holes) formed therein, a safety plate 143 installed under the cap-up 141, a connection ring 145 installed under the safety plate 143, a cap-down 146 coupled to the connection ring 145 and having first and second openings 146a and 146b (e.g., through-holes) formed therein, a sub plate 147 fixed to a bottom portion (e.g., a bottom surface) of the cap-down 146 and electrically connected to the positive electrode tab 125, and an insulation gasket 148 insulating the cap-up 141, the safety plate 143, the connection ring 145, and the cap-down 146 from the side portion 112 of the cylindrical can 110.

The insulation gasket 148 is configured to be compressed between the bead 113 and the crimping portion 114 formed substantially at the side portion 112 of the cylindrical can 110. In addition, the cap-up 141 and the second opening(s) 146b in the cap-down 146 may serve to discharge internal gases to the outside when an abnormal internal pressure is generated in the cylindrical can 110. When the safety plate 143 is upwardly inverted due to the internal pressure (e.g., due to the abnormal internal pressure), the safety plate 143 is electrically disconnected from the sub plate 147 and is ruptured to then discharge the internal gases to the outside.

In addition, the electrolyte is injected into the cylindrical can 110 and allows lithium ions generated by an electrochemical reaction taking place between the negative electrode plate 121 and the positive electrode plate 122 during charging and discharging of battery to move. In some embodiments, the electrolyte may be a non-aqueous, organic electrolyte that is a mixture of a lithium salt and a high-purity organic solvent. In other embodiments, the electrolyte may be a polymeric electrolyte using a polymer or a solid electrolyte. However, embodiments of the present invention are not limited to the kinds of electrolyte discussed above.

In the secondary battery 100 according to embodiments of the present invention, a top-end height of the cap assembly 140 may be equal to or less than a top-end height of the cylindrical can 110. For example, a height from the bottom portion 111 of the cylindrical can 110 to a top end (e.g., to a top or uppermost surface) of the cap-up 141 of the cap assembly 140 may be equal to or less than a height from the bottom portion 111 of the cylindrical can 110 to a top end (e.g., to a top or uppermost surface) of the crimping portion 114. Therefore, the secondary battery 100 according to embodiments of the present invention can accommodate an electrode assembly having the same height as and a larger volume than the conventional electrode assembly, thereby achieving a relatively high-capacity rechargeable battery.

Figure 2A:
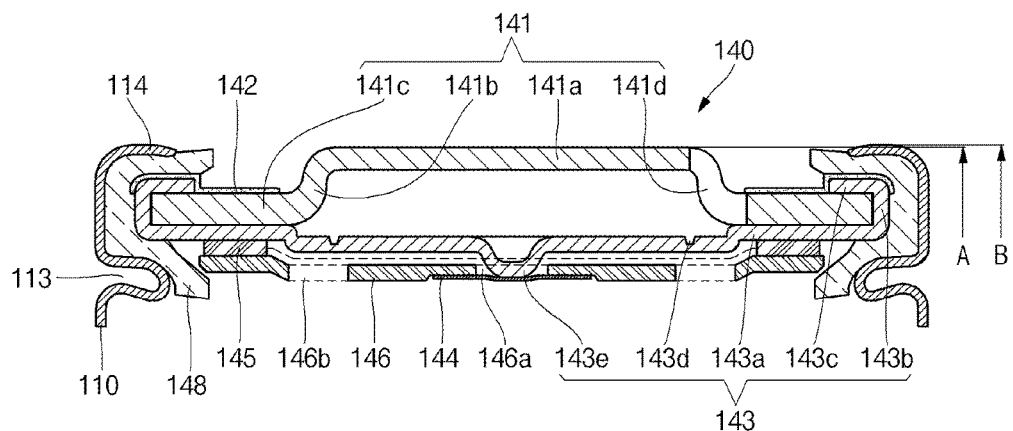
FIG. 2A is a cross-sectional view illustrating a coupling configuration of a cylindrical can and a cap assembly in the secondary battery according to various embodiments of the present invention.
Figure 2B:
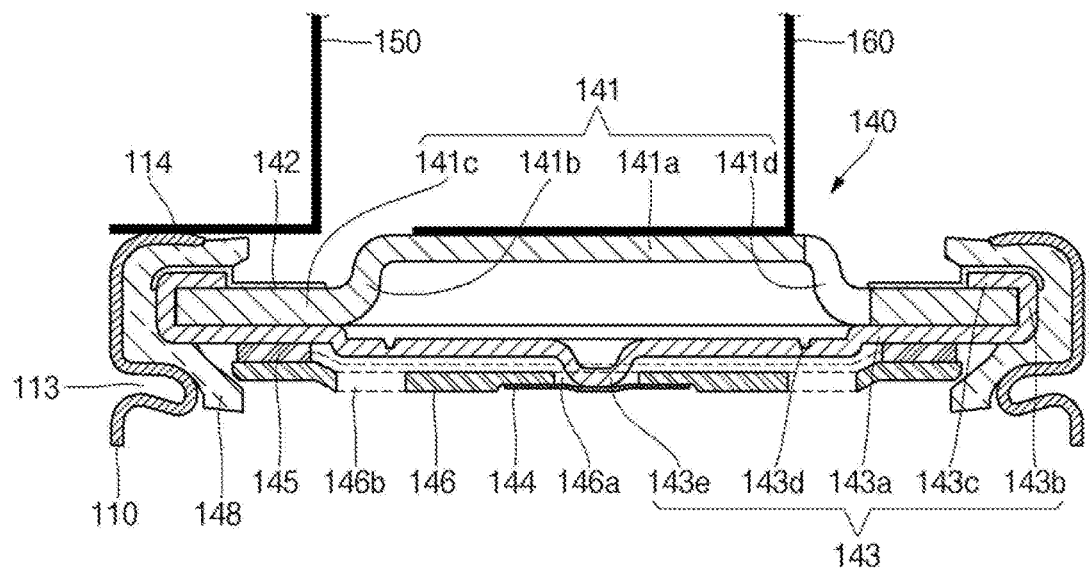
FIG. 2B is a cross-sectional view illustrating a state in which a negative electrode lead tab is connected to the cylindrical can.
Figure 3A:
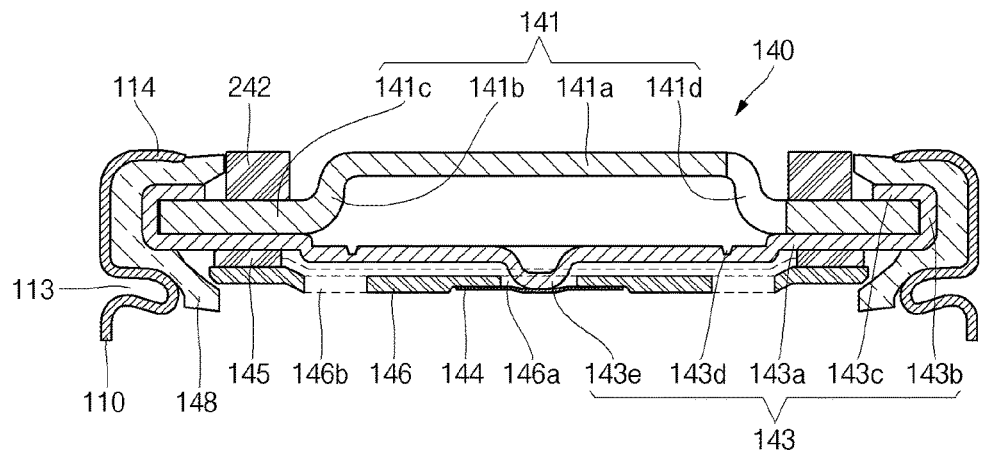
FIG. 3A is a cross-sectional view illustrating a coupling configuration between a cylindrical can and a cap assembly in the secondary battery according to various embodiments of the present invention.
Figure 3B:
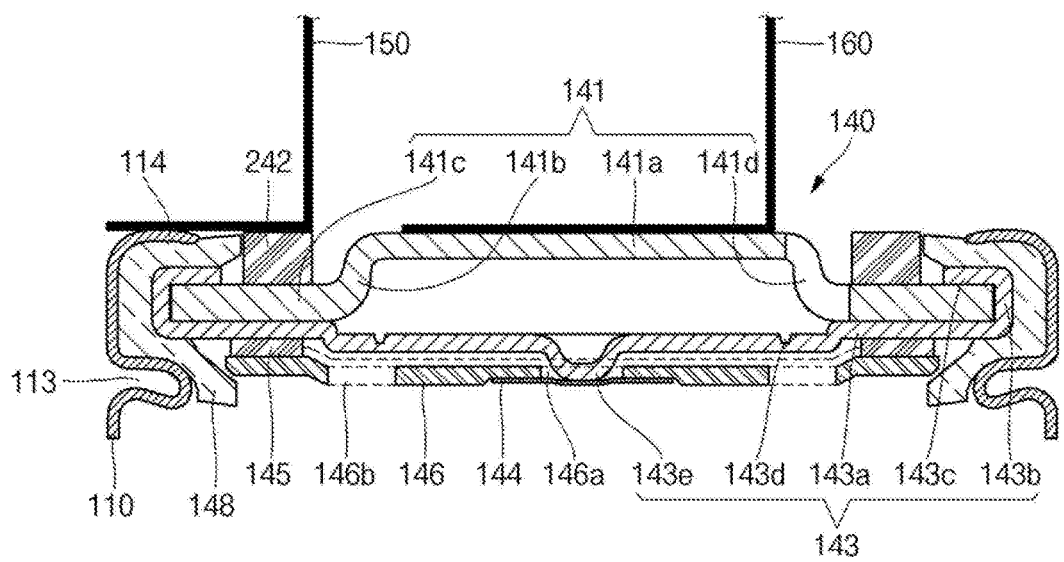
FIG. 3B is a cross-sectional view illustrating a state in which a negative electrode lead tab is connected to the cylindrical can.

In addition, according to embodiments of the present invention, a negative electrode lead tab 150 and a positive electrode lead tab 160 may be welded to generally upper regions of the secondary battery 100 (Refer to FIGS. 2b and 3b). In some embodiments, the negative electrode lead tab 150 may be electrically connected to the top end of the cylindrical can 110, for example, to the top end of the crimping portion 114, and the positive electrode lead tab 160 may be electrically connected to the top end of the cap assembly 140, for example, to the cap-up 141.

Accordingly, when the negative electrode lead tab 150 and the positive electrode lead tab 160 are welded to the upper regions of the secondary battery, a separate wiring structure in a lower region of the secondary battery 100 may be omitted. Therefore, a module structure for the lower region of the secondary battery 100 can be simplified, thereby allowing the secondary battery 100 according to embodiments of the present invention to be conveniently used as a power source of an electric vehicle.

FIG. 2A is a cross-sectional view illustrating a coupling configuration between a cylindrical can (110) and a cap assembly (140) in the secondary battery (100) according to various embodiments of the present invention. FIG. 2B is a cross-sectional view illustrating a state in which a negative electrode lead tab (150) is connected to the cylindrical can (110).

Assuming that the height from the bottom portion 111 of the cylindrical can 110 to the top end of the cap assembly 140 (e.g., the top end of the cap-up 141) is A and the height from the bottom portion 111 of the cylindrical can 110 to the top end of the cylindrical can 110 (e.g., the top end of the crimping portion 114) is B, the relationship $A \leq B$ may be satisfied. In some embodiments including this structure, the negative electrode lead tab 150 may be welded to the crimping portion 114 and the positive electrode lead tab 160 may be welded to the cap-up 141.

The structure of the cap assembly 140 will now be described in more detail.

The cap-up 141 of the cap assembly 140 includes a terminal portion 141a, a bent portion 141b, and an extending portion 141c. The terminal portion 141a is planar or substantially planar and is connected to a positive electrode lead tab 160. The bent portion 141b is downwardly bent from the periphery of the terminal portion 141a and includes at least one opening 141d. In addition, the extending portion 141c may horizontally extend to the outside from the bottom end of the bent portion 141b.

The cap assembly 140 may generally be made of aluminum, an aluminum alloy, steel, a steel alloy, nickel, a nickel alloy, or an equivalent thereof, but embodiments of the present invention are not limited thereto.

An insulation layer 142 having a certain thickness (e.g., a predetermined thickness) may be further formed (or arranged) on the extending portion 141c of the cap-up 141. For example, because the extending portion 141c has a generally circular ring shape when viewed in a plane, the insulation layer 142 may also have a generally circular ring shape when viewed in a plane. The insulation layer 142 may be made of polyimide (PI), benzocyclobutene (BCB), polybenzoxazole (PBO), bismaleimide triazine (BT), phenol resin, epoxy, and/or an equivalent thereof, but embodiments of the present invention are not limited thereto.

The safety plate 143 of the cap assembly 140 includes a main body 143a, a main-body bent portion 143b, and a main-body extending portion 143c. The main body 143a is generally positioned under the cap-up 141, and a plurality of vent notches 143d (e.g., a plurality of vent openings or vent holes) are formed on a surface (e.g., an upper surface) of the main body 143a. A lower protrusion part 143e downwardly protrudes from a generally central region of the main body 143a to be connected to a sub plate 144. The main-body bent portion 143b is upwardly bent from the periphery of the main body 143a to then surround the periphery of the extending portion 141c of the cap-up 141. In addition, the main-body extending portion 143c horizontally extends to the inside of the main body 143a from the main-body bent portion 143b to then cover a top surface of the extending portion 141c of the cap-up 141. For example, the main-body extending portion 143c of the safety plate 143 covers a portion of the extending portion 141c of the cap-up 141.

In some embodiments, the insulation layer 142 may be formed on the main-body extending portion 143c of the safety plate 143, and the insulation layer 142 may also be formed on the bent portion 141b of the safety plate 143. The insulation layer 142 formed on the extending portion 141c of the cap-up 141 and the insulation layer 142 formed on the main-body extending portion 143c of the safety plate 143 are, in some embodiments, integrally connected to each other without a disconnect therebetween. For example, in the secondary battery 100 according to some embodiments, the insulation layer 142 is formed on the upwardly exposed extending portion 141c of the cap-up 141 and on the main-body extending portion 143c of the safety plate 143, thereby preventing the extending portion 141c and the main-body extending portion 143c from being directly exposed to the outside. The insulation layer 142 covers ends of the main-body extending portion 143c of the safety plate 143.

The insulation layer 142 may be formed on, for example, the entire top surface of the cap-up 141 and the entire top surface of the safety plate 143, and a portion of the insulation layer 142 formed on the terminal portion 141a (e.g., only a portion of the insulation layer 142 formed on the terminal portion 141a) of the cap-up 141 may then be removed, thereby providing the insulation layer 142 having the structure as shown in FIG. 2A. In some embodiments, the insulation layer 142 may be formed by, for example, spin coating, printing, spray coating, sintering, thermal oxidation, physical vapor deposition (PVD), chemical vapor deposition (CVD), or atomic layer deposition (ALD), but embodiments of the present invention are not limited thereto.

Due to such a processing characteristic (e.g., according to such a processing method), a thickness of the insulation layer 142 may be much less than that of the cap-up 141. For example, the thickness of the insulation layer 142 may be less than a height of the bent portion 141b of the cap-up 141. For example, the insulation layer 142 may be a thin film (e.g., may be formed of a thin film) and may insulate the extending portion 141c of the cap-up 141, the main-body extending portion 143c of the safety plate 143, and the ends of the main-body extending portion 143c from the outside.

In addition, because an insulation gasket 148 is positioned outside the safety plate 143, the insulation layer 142 is configured to be interposed between the insulation gasket 148 and the safety plate 143. Because a coupling force between the insulation gasket 148 and the insulation layer 142 is much greater than a coupling force between the insulation gasket 148 and the safety plate 143, leakage of an electrolyte or penetration of external moisture can be efficiently reduced or prevented by the insulation layer 142.

As shown in FIG. 2B, the negative electrode lead tab 150 may be welded to the top end of the cylindrical can 110. For example, the negative electrode lead tab 150 having a substantially bar-like shape may be welded and fixed to the top end of the crimping portion 114 by ultrasonic welding, resistance welding, or laser welding. In some embodiments, a certain region (e.g., a predetermined region) of the negative electrode lead tab 150 may be superposed on or over the insulation gasket 148 and/or the extending portion 141c of the cap-up 141 as well as on the cylindrical can 110. As described above, because the film-type insulation layer 142 is on (e.g., is pre-fabricated on) the extending portion 141c of the cap-up 141, chances of an electrical short between the negative electrode lead tab 150 and the extending portion 141c of the cap-up 141 can be efficiently reduced or prevented. As an example, during welding of the negative electrode lead tab 150, there is a risk that ends of the negative electrode lead tab 150 may be electrically shorted to the extending portion 141c of the cap-up 141. The risk can be fundamentally mitigated or avoided by the insulation layer 142 being fabricated on the extending portion 141c of the cap-up 141. Also, the positive electrode lead tab 160 may be electrically welded to the terminal portion 141a of the cap-up 141.

FIG. 3A is a cross-sectional view illustrating a coupling configuration of a cylindrical can (110) and a cap assembly (140) in the secondary battery (100) according to various embodiments of the present invention.

FIG. 3B is a cross-sectional view illustrating a state in which a negative electrode lead tab (150) is connected to the cylindrical can (110).

Characteristics of the cylindrical can 110 and the cap assembly 140 illustrated in FIGS. 3A and 3B are the same or substantially the same as those of the cylindrical can 110 and the cap assembly 140 illustrated in FIGS. 2A and 2B.

The cap-up 141 of the cap assembly 140 includes a terminal portion 141a, a bent portion 141b, and an extending portion 141c. In some embodiments, an insulation layer 242 having a certain thickness (e.g., a predetermined thickness) may be formed on the extending portion 141c of the cap-up 141. For example, the insulation layer 242 having the certain thickness may be formed on the extending portion 141c of the cap-up 141. In some embodiments, the thickness of the insulation layer 242 may be greater than that of the extending portion 141c and less than a top-end height of the cylindrical can 110 (e.g., the insulation layer 242 may not protrude above the top end of the cylindrical can 110). For example, the thickness of the insulation layer 242 may be equal to or less than a height of the bent portion 141b of the cap-up 141. For example, a top surface of the insulation layer 242 may be coplanar or substantially coplanar with a top surface of the cylindrical can 110 (e.g., a top surface of the crimping portion 114). However, in some embodiments, the top surface of the insulation layer 242 is not higher than (e.g., does not protrude above) the top surface of the cylindrical can 110 (e.g., is not higher than the top surface of the crimping portion 114 and/or a top surface of the terminal portion 141a of the cap-up 141). The insulation layer 242 may have a generally circular ring shape when viewed in a plane.

The insulation layer 242 may be made of a hot-melt block or an equivalent thereof, but embodiments of the present invention are not limited thereto. The hot-melt block exists as a solid polymer at room temperature. When the hot-melt block is heated, it adheres to the extending portion 141c of the cap-up 141 while maintaining a relatively high viscosity and, as it cools, is solidified while maintaining its adhesiveness.

As an example, the hot-melt block may include a hot melt including (or consisting of) co-polyamides (CoPA), co-polyesters (CoPES), thermoplastic polyurethane (TPU), fatty acid CoPA, polyolefins (polyethylene (PE)/polypropylene (PP)), metallocene polyolefin (mPO), ethylene vinyl acetate (EVA), rubber pressure sensitive adhesive (PSA), non-crystalline (solvent-base) polyester, and/or flame retardant hot melt, but embodiments of the present invention are not limited thereto. In addition, the hot-melt block may be a granule/resin type, a powder type, a film type, a web type, a stick type, a waterborne suspension type, a water-soluble adhesive type, a waterborne paste type, a solvent type, an alcohol-soluble type, and/or a filament type, but embodiments of the present invention are not limited thereto.

The insulation layer 242, such as the hot-melt block, may be formed on (or adhered to) the extending portion 141c of the cap-up 141 to have a circular ring shape by using a hot-melt gun having a hot-melt stick mounted therein, but embodiments of the present invention are not limited thereto.

As shown in FIG. 3B, the negative electrode lead tab 150 may be welded to the top end of the cylindrical can 110. For example, the negative electrode lead tab 150 having a substantially bar-like shape may be welded and fixed to the top end of the crimping portion 114. In some embodiments, a certain region (e.g., a predetermined region) of the negative electrode lead tab 150 is positioned on the insulation gasket 148 and on the extending portion 141c of the cap-up 141 as well as on the cylindrical can 110. As described above, because the block-type insulation layer 242 is formed on the extending portion 141c of the cap-up 141, an electrical short between the negative electrode lead tab 150 and the cap-up 141 can be efficiently prevented. As an example, during welding of the negative electrode lead tab 150, there is a risk that ends of the negative electrode lead tab 150 may be electrically shorted to the extending portion 141c of the cap-up 141. The risk can be fundamentally mitigated or avoided by the insulation layer 242. In addition, the negative electrode lead tab 150 is generally positioned to be spaced from (e.g., spaced apart from) the insulation layer 242. However, in some embodiments, the negative electrode lead tab 150 may also be brought into direct contact with the insulation layer 242 to be stably supported.

In addition, because the opening 141d formed in the bent portion 141b of the cap-up 141 is not covered by or clogged with the block-type insulation layer 242 (e.g., the block-type insulation layer 242 is positioned to be spaced from the opening 141d), internal gases of the secondary battery 100 can be easily released when the safety plate 143 operates. In some embodiments, the block-type insulation layer 242 is flame retardant (e.g., is formed of a flame retardant material) so as not to be burnt by high-temperature gases.

While the secondary battery according to exemplary embodiments of the present invention has been particularly shown and described, it will be understood by those of ordinary skill in the art that various changes in form and details may be made therein without departing from the spirit and scope of the present invention as defined by the following claims and their equivalents.

What is claimed is:

1. A secondary battery comprising:
   a cylindrical can;
   an electrode assembly accommodated in the cylindrical can;
   a cap assembly sealing the cylindrical can, a top-end height of the cap assembly being equal to or less than a top-end height of an electrically-conductive portion of the cylindrical can;
   an insulation gasket between the cylindrical can and the cap assembly; and
   an insulation layer on a surface of the cap assembly that is exposed to the outside of the cylindrical can.

2. The secondary battery of claim 1, wherein the insulation layer comprises a polyimide film or a hot melt block.

3. The secondary battery of claim 1, wherein the cap assembly comprises a cap-up comprising:
   a terminal portion;
   a bent portion downwardly bent from the terminal portion; and
   an extending portion outwardly extending from the bent portion, and
   wherein the insulation layer is on the extending portion of the cap-up.

4. The secondary battery of claim 3, wherein a thickness of the insulation layer is less than a height of the bent portion.

5. The secondary battery of claim 3, wherein a thickness of the insulation layer is equal to or less than a height of the bent portion.

6. The secondary battery of claim 3, wherein the cap assembly further comprises a safety plate comprising:
   a main body under the cap-up;
   a main-body bent portion upwardly extending from a periphery of the main body; and
   a main-body extending portion inwardly extending from the main-body bent portion and covering a top surface of the cap-up, and
   wherein the insulation layer is on the main-body extending portion of the safety plate.

7. The secondary battery of claim 6, wherein the insulation layer on the cap-up and the insulation layer on the safety plate are connected to each other.

8. The secondary battery of claim 1,
   wherein the insulation layer is between the insulation gasket and the cap assembly.

9. The secondary battery of claim 1, further comprising a lead tab connected to a top end of the cylindrical can.

10. The secondary battery of claim 9, wherein the insulation layer is between the lead tab and the cap assembly.

11. The secondary battery of claim 1, wherein an uppermost surface of the cylindrical can is electrically exposed and configured to be electrically connected to an external device.

* * * * *